US005535796A

United States Patent [19]
Line et al.

[11] Patent Number: 5,535,796
[45] Date of Patent: Jul. 16, 1996

[54] FLAIL CHAIN CONNECTOR

[75] Inventors: Robert P. Line, Baltimore; Bryan Naylor, Oshawa, both of Canada

[73] Assignee: Columbus McKinnon Limited, Cobourg, Canada

[21] Appl. No.: 279,188

[22] Filed: Jul. 22, 1994

[30] Foreign Application Priority Data

Oct. 29, 1993 [CA] Canada ................................ 2102056

[51] Int. Cl.⁶ .............................. B27L 1/00; F16G 13/06
[52] U.S. Cl. ................................ 144/208.7; 59/87; 59/90; 59/93; 59/78; 24/573.3; 24/698.2; 144/341; 144/343; 144/24.13; 56/12.7
[58] Field of Search .............................. 56/12.7; 152/241, 152/233, 243; 59/78, 82–87, 90, 91, 93; 144/2 Z, 208 R, 208 J, 341, 343; 24/573.3, 698.2

[56] References Cited

U.S. PATENT DOCUMENTS

| | | |
|---|---|---|
| 1,060,744 | 5/1913 | Covert .......................................... 59/85 |
| 1,376,299 | 4/1921 | Sullivan . | |
| 1,411,836 | 4/1922 | Bond ........................................... 59/85 |
| 1,516,363 | 11/1924 | Watson . |
| 1,542,490 | 6/1925 | Clark . |
| 1,546,430 | 7/1925 | Blitz . |
| 1,796,607 | 3/1931 | McDowell . |
| 4,063,583 | 12/1977 | Rieger et al. ................................ 59/85 |
| 5,343,912 | 9/1994 | Chronister et al. ....................... 144/341 |

FOREIGN PATENT DOCUMENTS 1006018  4/1952  France .

Primary Examiner—W. Donald Bray
Attorney, Agent, or Firm—John C. Hunt

[57] ABSTRACT

A flail chain connector is provided which may be applied to an existing wood debarking apparatus or machinery for cutting vegetation. The connector is provided with integral fasteners for removable attachment of a length of flail chain to a powered rotary shaft, The connector may be removably engaged with the flail chain by moving a rink in the flail chain and one integral fastener to a first relative position and thereafter moving the link and fastener into a second relative position. The connector may be disengaged from the flail chain by relative movement of the link and fastener from the second position to the first position, and finally to the disengaged position. The connector may be removably engaged to the shaft by a second fastener through relative movements to a first and second relative positions.

3 Claims, 3 Drawing Sheets

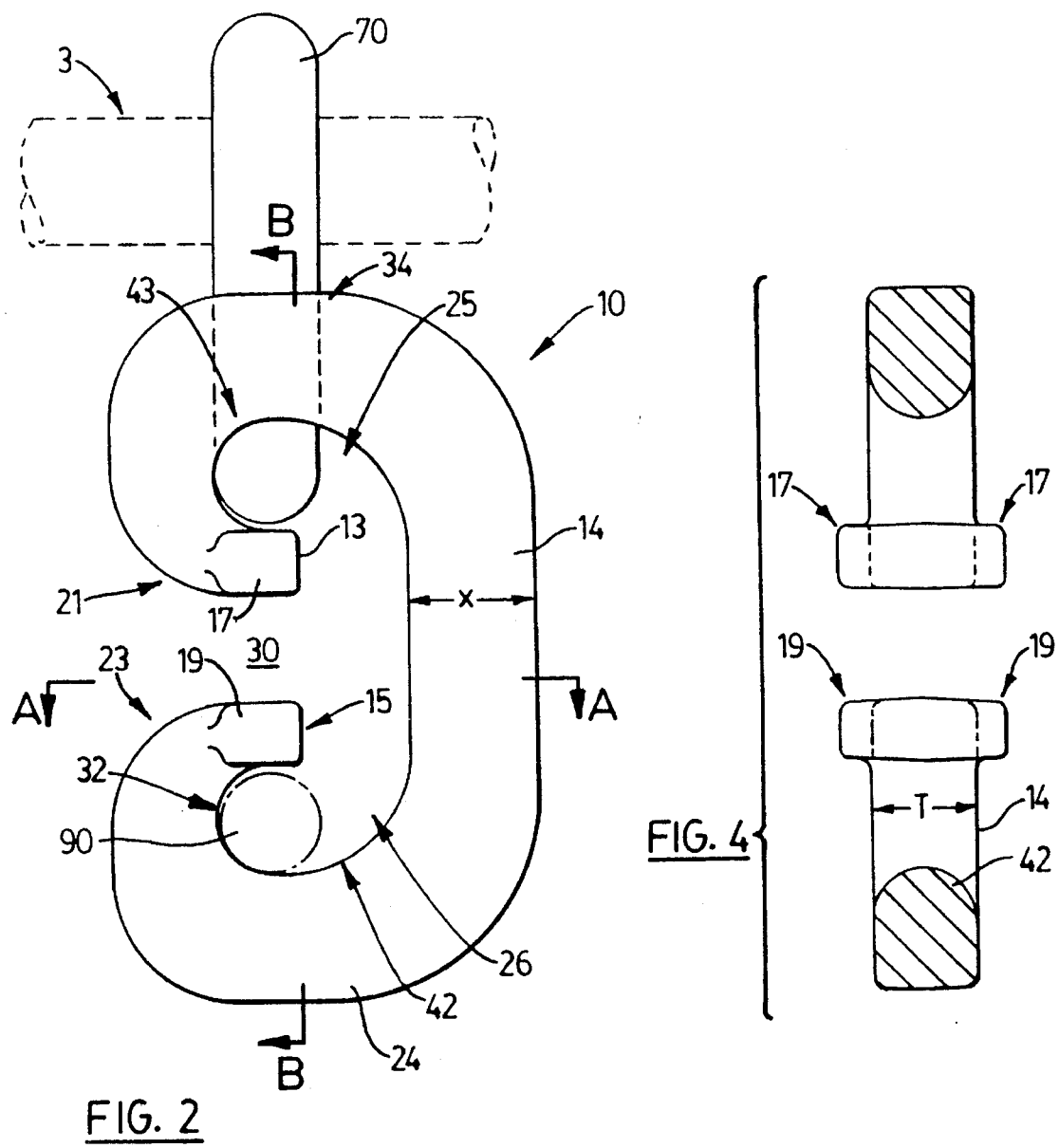
FIG. 2
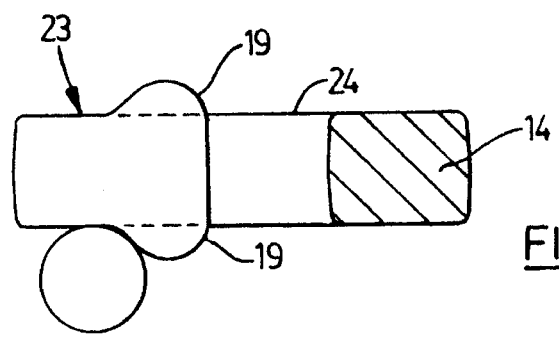
FIG. 3
FIG. 4

FLAIL CHAIN CONNECTOR

FIELD OF THE INVENTION

This invention relates to a connector for use a in debarking apparatus of the type typically having one or more rotary shafts. In particular, the connector may be used as a link between flail chain components and the powered rotary shaft members.

BACKGROUND TO THE INVENTION

It is common in the forest industry to use debarking machinery in field applications, particularly, where softwood harvesting occurs. Debarking machinery when used in the field, can in most instances generate good quality wood products suitable for chipping purposes with a maximum bark content of less than 1% (by weight). Most commonly used debarking machines utilize a series of rotating shafts operating in parallel to each other. Each rotary shaft typically supports a number of flail chains connected in set arrangement, uniformly spaced, along the length of each rotating shaft.

The condition of the flail chain affects the quality of the debarked wood product produced by the debarking machine. A machine using newly replaced chain tends to produce better quality wood products corresponding to a reduced bark content. As the chain wears, bark content of the end product tends to increase thereby making it desirable to replace the chain. In many field applications, it is found that the last three or four chain links nearest the flail end, through either repeated contact with wood product or striking each other, experience higher degrees of wear. Where possible, field operators attempt to reposition flail chain by disconnecting the chain from the rotary shafts and repositioning the flail chain so that the links with the highest degree of wear are located adjacent to the rotary shafts thereby exposing the least worn links to contact with bark containing wood products.

In conventional debarking equipment, each rotary shaft securely houses a number of flail chain support rods. The installation or removal of flail chain from each rod involves a labour intensive operation whereby the rod is either removed from, or inserted into, the terminal link of each flail chain and this procedure is repeated for the next adjacent flail chain dedicated to that rod. Typically, one person must move the rod along the interior chamber of the rotary shaft while another person assists by supporting or removing the flail chain members from a position outside of the shaft chamber.

To provide a flail chain connector capable of securement to the rotary shaft and the flail chain from a position outside of the chamber may have been thought impracticable due to a number of considerations. In any event, a locking connector having quick-connect features of the type disclosed herein is not presently known to the applicants.

GENERAL DESCRIPTION OF THE INVENTION

According to the invention there is provided a connector for a debarking apparatus of the type having at least one rotary shaft having loop means adapted to suspend flail chain having an elongated terminal link. The connector comprises a first end and second end connected by an elongated web; engagement means adjacent the first end adapted to allow removable engagement with the loop means in its first position relative to the connector and adapted to disallow such removable engagement in its second position relative to the connector; and engagement means adjacent the second end adapted to allow removable engagement with the terminal link in its first position relative to the connector and adapted to disallow such removable engagement in its second position relative to the connector. Thus, when the terminal link is placed into the first position, it may be readily removed from the connector, On the other hand, when a terminal link and the second engagement means of the connector are engaged in the first relative position and then moved into the second relative position during engagement, the terminal link of the flail chain may not be disengaged until it is returned back to the first relative position.

The invention may also include a number of configurations for the connector, The connector may take the form of a generally C-shaped member, a generally S-shaped member, a generally I-shaped member or other configurations.

The invention may also include a combination of the assembled flail chain and flail chain connector member.

The first and second engagement means may comprise retainer means which extend in a perpendicular direction away from the elongated web. One or both of the first and second engagement means may also comprise inwardly facing members, The first and second ends of the connector may be adapted to form an engagement channel. The engagement channel may be contoured to have a width corresponding generally with the thickness of the flail chain terminal link and the elongated loop.

The second engagement means may also comprise features adapted to bias the terminal link toward its second position.

In a particular embodiment, the invention provides a connector for connecting first and second closed chain links, each link having a major axis, and the first link being connected to a rotary, shaft of an apparatus for removing bark from tree trunks and the second link being part of a flail chain for the apparatus. The connector incluldes an elongate discontinuous ring having a major axis, there being a channel defined between two adjacent ends of the ring to permit passage of each link therethrough during assembly of the links and the connector, the channel being located intermediate lengthwise ends of the ring and each of the ends of the ring having an enlarged portion to preclude removal of a said link from the connector in use. The enlarged portion of at least a first of the ends has a major axis in a plane generally perpendicular to the major axis of the ring to permit passage of the link past the first end when the major axis of a said link is aligned with the major axis of the end during assembly of the loop and connector and to preclude passage of the ring past the first end when the major axes of the enlarged portion and the link are substantially perpendicular to each other.

In the debarking apparatus of the prior art, the use of flail chain members directly supported by internal rotary shaft rods gave rise to inherent disadvantages.

BRIEF DESCRIPTION OF THE DRAWINGS

Drawings are appended hereto which illustrate exemplary embodiments of the present invention.

FIG. 2 is a plan view of one embodiment of the present invention;

FIG. 3 is a sectional view along line A—A in FIG. 2;

FIG. 4 is a sectional view along line B—B in FIG. 2;

DESCRIPTION OF PREFERRED EMBODIMENTS

Figure 1:
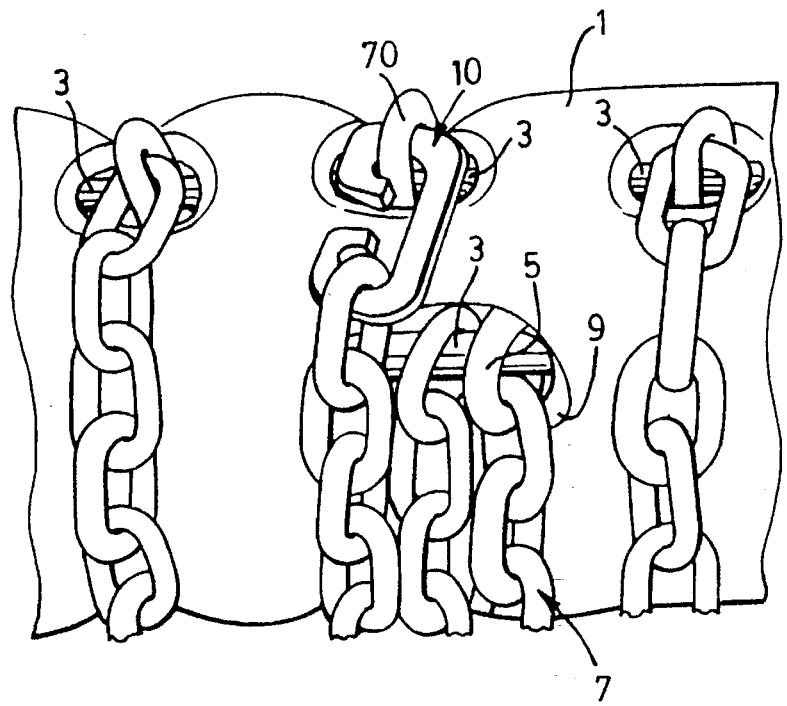
FIG. 1 is a front elevational view of a rotary shaft mechanism in partial section showing the shaft and lengths of flail chain suspended from the shaft.

FIG. 1 shows a typical hollow core rotary shaft 1 of a debarking apparatus with one embodiment of the present invention, a connector 10, suspending one length of flail chain. The core of the shaft houses a plurality of suspension rods inserted through the terminal links 5 of other flail chains 7. When the rotary shaft and flail chains 7 are at rest, the chains are suspended in a generally downward direction due to gravitational force, as shown in FIG. 1.

The terminal links 5 are situated in a passageway which provides an access port 9 to the suspension rods 3. In this typical configuration, the suspension rod must be retracted along its axis until the terminal link 5 of the flail chain 7 can be removed from the rod end. This procedure must be employed for all flail chains 7 directly suspended from a given suspension rod by terminal links 5.

Similarly, when flail chains 7 are to be reconnected, it is common for a first person to insert the suspension rod 3 into the hollow core of the rotary shaft 1. The first person continues to slowly introduce the rod along each of the corresponding ports 9 while a second person loops terminal links 5 on to the progressing end of the rod.

It is to be understood that the foregoing embodiment of a rotary shaft debarking apparatus is only one example of a number of different types of debarking systems to which the present invention may be applied. For example, multiple flail chains may be suspended through individual ports 9. Alternatively, the present invention may be applied to provide quick-connect features for replacement of flail chains in other types of machinery used to cut vegetation.

FIGS. 2, 3, 4 and 5 show an embodiment of the present invention. Connector 10 is shown having a generally C-shaped configuration, i.e., an elongated discontinuous ring having major axis 11 with enlarged connector ends 13 and 15. Web 14 is of generally elongated configuration and connects ends 13 and 15, channel 30 being defined between the ends to permit passage of each of links 70, 90 therethrough during assembly of the connector and links. During use, loop or link 70 would be generally oriented as shown in FIG. 2 while link 90 would be oriented similarly at the opposite end of the connector. The channel is located intermediate lengthwise ends of the ring and enlarged portions 17, 19 are located at the ends to preclude removal of the links from the connector in use. The width "x" (and thickness "T") of the web 14 are of sufficient dimension to impart necessary material strength characteristics within applicable spatial considerations. The disclosed links are of rigid material, particularly cast micro-alloy steel.

Integral flange members 17 and 19 of the enlarged ends are provided as shown. In FIG. 4, it can be readily observed that flange members 17 and 19 project perpendicularly from the terminal ends 13 and 15 of the web and each has a major axis 12 which is generally-perpendicular to axis 11 of the connector ring. In FIG. 2, arm members 21 and 23 project inwardly from one side of the connector member to form a channel 30 of a width sufficient to accommodate the widths of both suspension loop 70 and terminal flail link 90. Suspension loop 70 and terminal link 90 are shown in their respective locked positions.

Both suspension loop 70 and terminal link 90 are shown to be of generally elongated configuration and of circular cross-section. Loop 70 and link 90 are also shown to have elongated internal channels with substantially rounded terminal ends of the types commonly found in standardized chain links.

Channel 26 is defined by the inner shoulder 42 and the inwardly projecting arm 23. Inner shoulder 42 is also gently sloped in a general downward direction away from channel 30. Similarly, due to the downward curvature of inner surface 32 of arm 23, terminal link 90 tends to be positioned such that it is not likely to move into a disengaging position, either when it is at rest or during operation of the rotary shaft within the debarking apparatus.

Inner shoulder 42 is also shown to be gently rounded. The radius of curvature of inner shoulder 42 may be selected to be approximately equal to the radius of curvature of the inner channel end 93 in the terminal link 90. The terminal link is in a generally downward position suspended from shoulder 24, in the locked position.

The width and thickness of the web at shoulder 24 are sufficient to prevent disengagement of terminal link 90 by translation up through channel 26 while link 90 substantially remains in its locked position. The width of the web generally tapers from the shoulder 24 along arm 23 and up to the narrowest segment adjacent flange 19, With reference to FIGS. 2 and 5, the width, or effective diameter, of the arm 23 adjacent flange 19 is sufficient to permit rotation of the link 90 through approximately 90–95° from the locked position, about an axis of rotation located near the terminal end of channel 26. After such first rotation, the terminal link is then rotated approximately 90° about arm 23. The second rotation of the terminal link 90 permits the link to be removed by passing the elongated interior channel of the terminal link 90 over the flanged end 15. The terminal link 90 is then disengaged from the connector by substantially translational movement through channel 30. Engagement of the terminal link 90 with the connector 10 may be effected by carrying out the foregoing procedural steps in reverse order. It will thus be appreciated that connector 10 can be used with conventional chains having closed links which are of essentially constant cross-section, as illustrated in FIGS. 1, 2, 3 and 5.

As noted above, suspension loop 70 is shown as a typical flail chain link suspended from the suspension rod 3. Engagement of the connector 10 with the loop 70 may be carried out by rotating connector 10. With reference to FIG. 2, connector 10 may be rotated approximately 90° to 95° upwardly to the left about an axis of rotation located generally within the terminal end of channel 25. The tapered shoulder 34 and arm 21 are passed through the internal channel of the link 70. Due to the reduced width of tapered arm 21 adjacent to flanges 17, the connector may then be rotated approximately 90° about the terminal end of the internal channel of the loop until the flanged end 17 may be passed through the internal channel of the loop. Disengagement is then completed by moving the connector 10 over loop 70 and passing the loop through channel 30.

In another embodiment of the invention, not shown, alternate securement means may be provided on the bar. For example, the loop means may comprise an upraised post and elongated flanged end adapted to engage with are elongated eye feature of the engagement means of the connector, also not shown.

Figure 6:
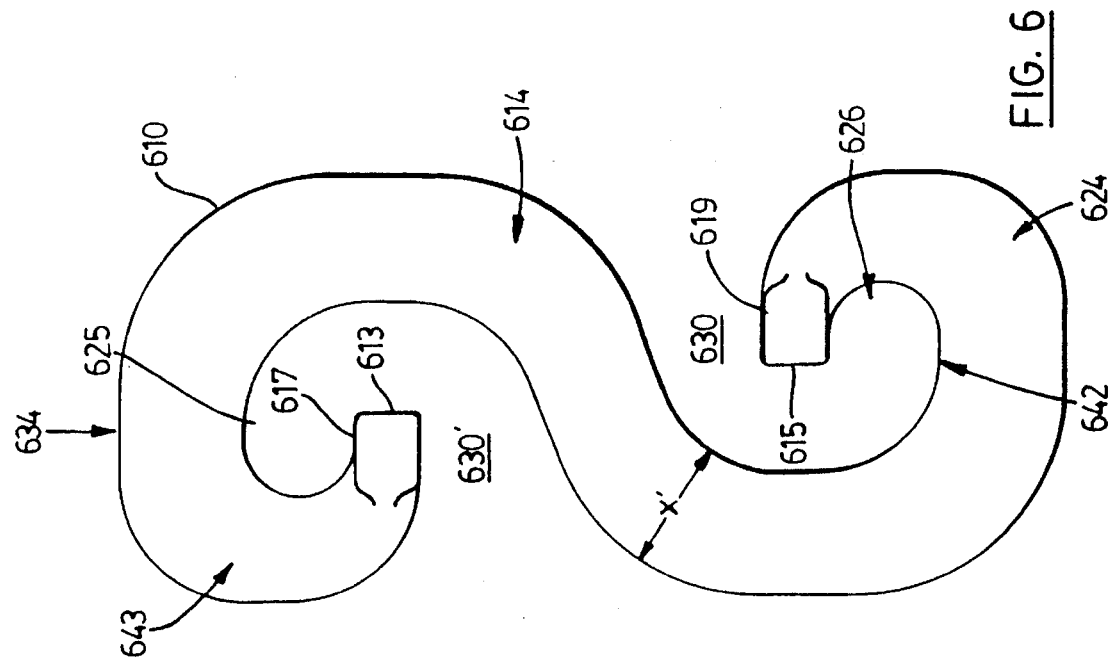
FIG. 6 is a plan view of a detail of another embodiment of the present invention.
Figure 5:
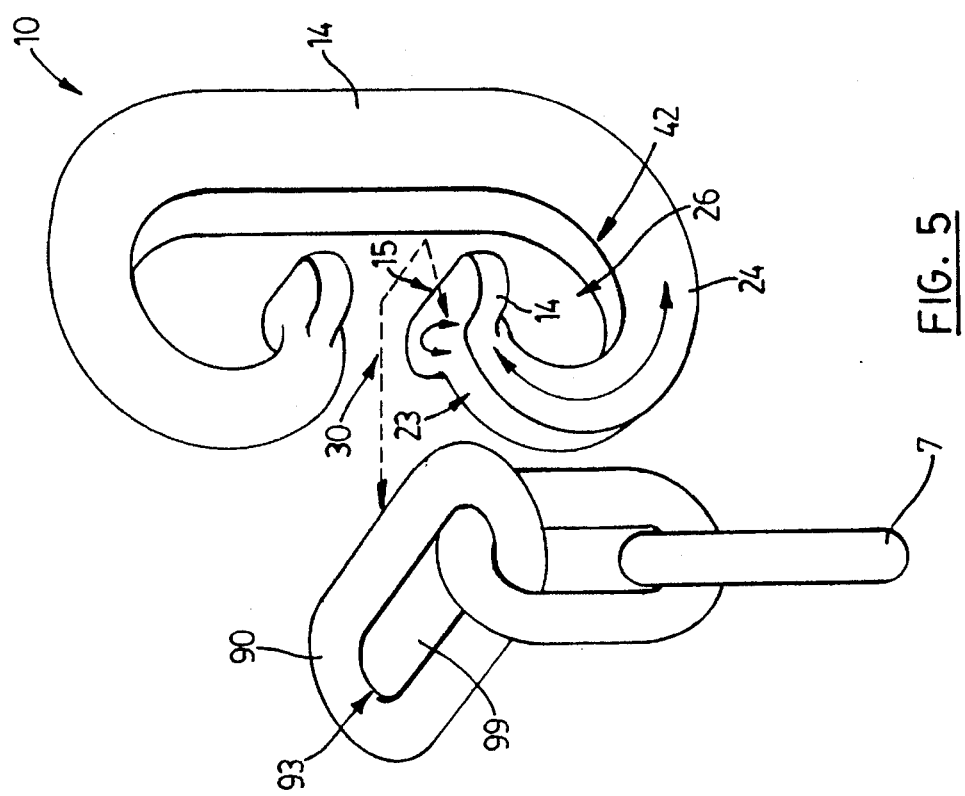
FIG. 5 is a perspective view of a portion of flail chain positioned for possible engagement with one embodiment of the invention.

In another embodiment, (see FIG. 6) the connector 610 is of generally reverse-S configuration. The embodiment illustrated herein is otherwise constructed in a manner similar to that described for the embodiment of FIGS. 2, 3, 4 and 5. Tapering arm 643 and tapering shoulder 634 are intended for removable engagement with the suspension loop 70. Engagement and disengagement of the connector 610 is carried out along channel 630. In a manner similar to that described above, the flanged end 613 with flanges 617 must be negotiated through the internal channel of the suspension loop 70 and the connector 610 must then be rotated about arm 643 and then rotated within the terminal portion of channel 625.

Similarly terminal link 90 may be removably engaged by passing the link 90 into channel 630, and then introducing flanged end 615 with flanges 619 into channel 99 of the terminal link 90. The terminal link may then to be rotated about arm 624 through approximately 90° followed by a second rotation within channel 626 until the link 90 is in the locked position, on shoulder 642.

Figure 7:
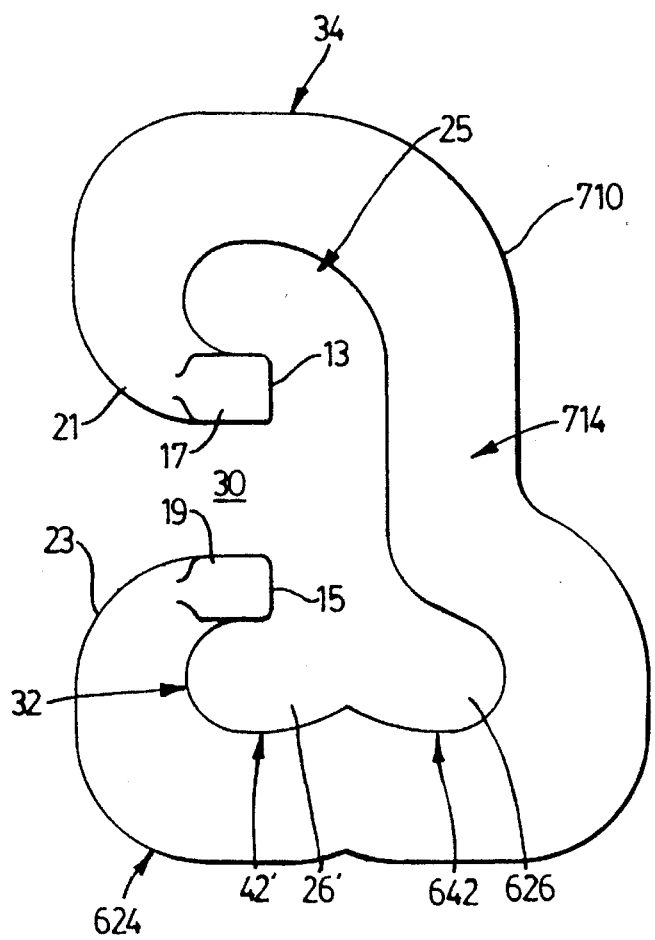
FIG. 7 is a plan view of a detail of yet another embodiment of the invention.

FIG. 7 shows yet another embodiment wherein the illustrated connector 710 is configured to suspend two flail chains from a single suspension loop 70, Connector 710 has a web 714 intermediate of tapering shoulders 34 and 624. Shoulder 624 is configured to support two terminal chain links 90 and 90' (not shown) within channels 26' and 626 respectively, The connector 710 is engaged and disengaged with the suspension loop at the upper end 13 in the manner described further above in respect of corresponding members in the embodiment of FIGS. 2, 3, 4 and 5.

With respect to engagement of terminal links 90 and 90', a first terminal link 90' is manipulated through channel 30 as described above, the inner channel of link 90' is passed over flanged end 15, rotated about tapered arm 23 until the link may be rotated within channel 26' to a first locked position on shoulder 42'. Terminal link 90' may then be moved along shoulder 42' and shoulder 642, into channel 626, and into the final locked position. The second terminal link 90 may then be placed into a locked position on shoulder 42' in a similar manner.

FIG. 7 illustrates an embodiment intended to suspend two flail chains. Yet further embodiments may be manufactured to suspend more than two flail chains, subject to adequate consideration for the strength of materials used and other design criteria applicable to the particular applications.

It is therefore understood that an inexpensive connector may be provided in this manner. Further useful modifications are intended to be covered by the following claims.

What is claimed is:

1. A flail chain comprising a connector and first and second closed chain links of the flail chain, each link comprising a member of essentially constant cross-section and having a major axis, wherein the connector comprises:

a rigid elongate discontinuous ring having a major axis lying in a plane of the ring, ends of the ring being located along a lengthwise edge thereof to define a channel therebetween, each of the ends of the ring having an enlarged portion to preclude removal of a said link from the connector when the axes of the link and the connector are located in a common plane; and wherein:

the enlarged portion of at least a first of the ends has a major axis generally perpendicular to the plane of the ring to permit, when the major axis of a said link is aligned with the major axis of the end, passage of the link through the channel between a position interior of the connector and a position exterior of the connector, and to preclude passage of a ring assembled onto the connector past the first end when the major axes of the enlarged portion and the link are substantially perpendicular to each other so as to preclude disassembly of the ring and connector.

2. The connector of claim 1 wherein the connector is of cast steel.

3. The flail chain of claim 1 wherein the connector includes a said enlarged portion at each end of the ring.

* * * * *